(12) United States Patent
Parish, Jr.

(10) Patent No.: US 7,481,381 B2
(45) Date of Patent: Jan. 27, 2009

(54) FUEL INJECTOR HAVING AN EXTERNAL CROSS-FLOW NOZZLE FOR ENHANCED COMPRESSED NATURAL GAS JET SPRAY

(75) Inventor: James R. Parish, Jr., Yorktown, VA (US)

(73) Assignee: Continental Automotive Systems US, Inc., Auburn Hills (*) Notice: Subject to any disclaimer, the term of this patent is extended or adjusted under 35 U.S.C. 154(b) by 237 days.

(21) Appl. No.: 11/427,911

(22) Filed: Jun. 30, 2006

(65) Prior Publication Data

US 2008/0011887 A1    Jan. 17, 2008

(51) Int. Cl.
- B05B 1/26 (2006.01)
- B05B 1/30 (2006.01)
- B05B 1/18 (2006.01)
- B05B 1/00 (2006.01)
- F02M 51/00 (2006.01)
- F02M 61/00 (2006.01)
- A62C 31/02 (2006.01)

(52) U.S. Cl. .......... 239/524; 239/585.1; 239/585.4; 239/533.12; 239/567; 239/600; 239/601

(58) Field of Classification Search .......... 239/5, 239/494, 496, 518, 521, 523, 524, 533.12, 239/548, 552, 553, 554, 567, 585.1, 585.4, 239/585.5, 596, 600, 601

See application file for complete search history.

(56) References Cited

U.S. PATENT DOCUMENTS

| 1,893,457 | A | * | 1/1933 | Tartrais | 239/453 |
| 2,295,081 | A | * | 9/1942 | Harvath | 239/533.7 |
| 2,592,111 | A | * | 4/1952 | Bischof | 239/533.7 |
| 4,014,472 | A | * | 3/1977 | Bischof | 239/533.1 |
| 5,494,224 | A | | 2/1996 | Hall | |
| 6,328,231 | B1 | | 12/2001 | Ording et al. | |
| 6,764,028 | B2 | * | 7/2004 | Mills et al. | 239/533.7 |
| 2008/0006713 | A1 | | 1/2008 | Parish, Jr. | |

* cited by examiner

*Primary Examiner*—Len Tran
*Assistant Examiner*—Ryan Reis

(57) ABSTRACT

A compressed natural gas fuel injector including a housing, an inlet, an outlet, a seat, a closure member, and an attached nozzle. In a preferred embodiment, the inlet and outlet communicate a flow of gaseous fuel regulated by the closure member. The gaseous fuel passes through the seat, which is coupled to a rim surface of a retainer portion of the attached nozzle, and into a flow passage that further communicates the flow of gaseous fuel into one or more flow channels. The orientation of the flow channels within the attached nozzle greatly affects the discharge pattern and mixing characteristics of the gaseous fuel within an intake manifold. A method of flowing gaseous fuel through the fuel injector is also described.

9 Claims, 5 Drawing Sheets

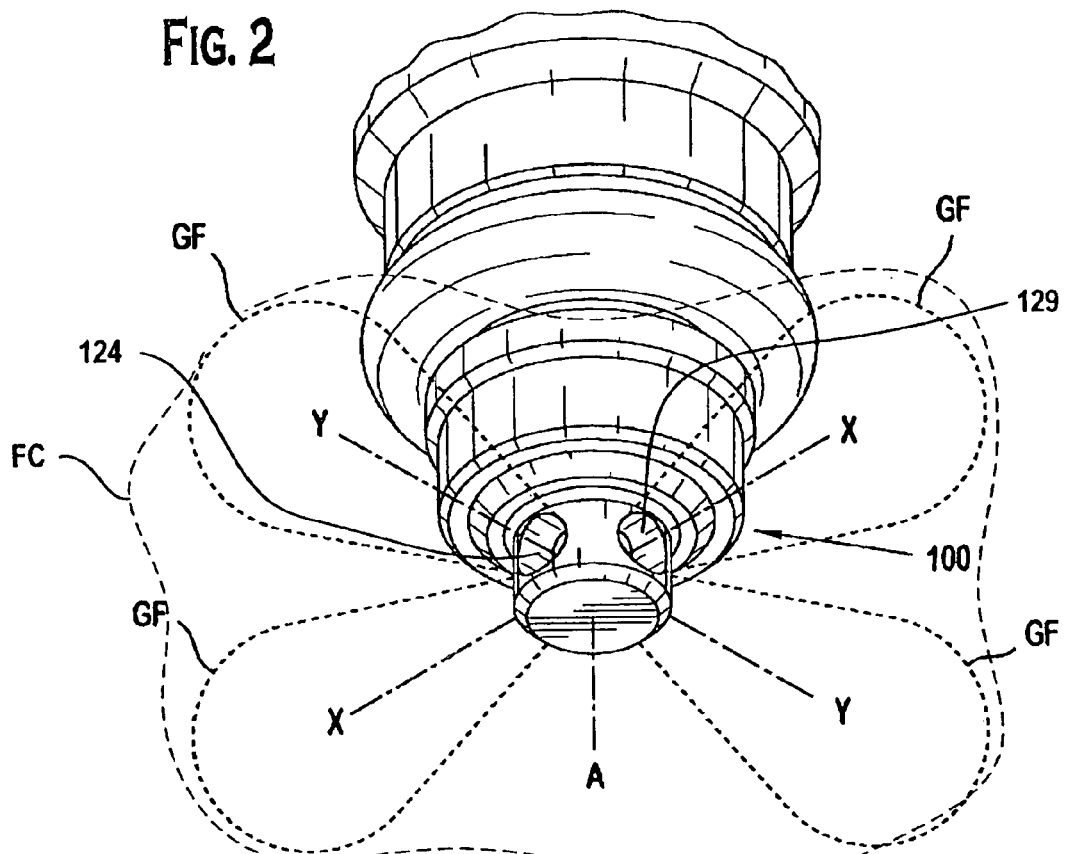
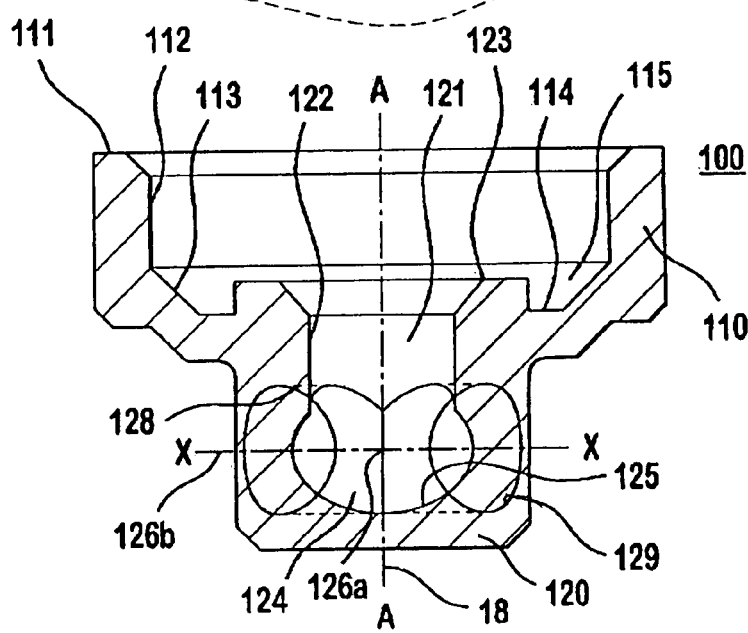

FUEL INJECTOR HAVING AN EXTERNAL CROSS-FLOW NOZZLE FOR ENHANCED COMPRESSED NATURAL GAS JET SPRAY

BACKGROUND OF INVENTION

In the case of internal combustion engines having injection systems, fuel injectors are conventionally used to provide a precise amount of fuel needed for combustion. Compressed natural gas (hereinafter sometimes referred to as "CNG") is a common automotive fuel for commercial fleet vehicles and residential customers. In vehicles, the CNG is delivered to the engine in precise amounts through fuel injectors, hereinafter referred to as "CNG injectors", or simply "fuel injectors". CNG injectors of this type are described in commonly assigned U.S. Pat. No. 5,494,224, the disclosure of which is incorporated by reference herein. Typically, the CNG injector is required to deliver the precise amount of fuel per injection pulse and maintain this accuracy over the life of the injector. In order to improve the combustion of fuel, certain strategies are required in the design of CNG injectors. These strategies are keyed to the delivery of gaseous fuel into the intake manifold of the internal combustion engine in precise amounts and flow patterns.

It is believed that some conventional CNG injector designs have failed to achieve suitable the combustion of gaseous fuel injected into the intake manifold of an internal combustion engine. Specifically, such design of CNG injectors may reduce air flow or even cause back-flow of the air-fuel mixture into the internal combustion engine's intake plenum or into other engine cylinders thereby causing engine misfire and other drivability problems.

SUMMARY OF THE INVENTION

The present invention provides improved gaseous fuel targeting and fuel distribution with an attached nozzle design for a CNG injector. Back-flow of the air-fuel mixture into the internal combustion engine's intake plenum or into other engine cylinders may be avoided by providing a discharge pattern that forms a cloud of CNG. The discharge pattern of CNG delivered to the intake manifold of the present invention is believed to improve the air-fuel mixture and drivability problems that are believed to be in the prior art.

In one aspect of the present invention, the CNG injector is provided with a housing, an inlet, an outlet, a seat, a closure member, and an attached nozzle. The inlet and outlet communicate with a flow of gaseous fuel that is regulated by the closure member disposed in at least two positions along the longitudinal axis. The seat is disposed proximate to the outlet and includes a sealing surface contiguous to a portion of the closure member in one of the two positions of the closure member and a seat orifice extending through the seat from the sealing surface along the longitudinal axis to a tapered surface that extends obliquely from the seat orifice about the longitudinal axis. Below the seat orifice, the seat is coupled to a rim surface of a retainer portion to define the beginning of a flow passage within the attached nozzle.

In a preferred aspect of the present invention, the attached nozzle includes both the retainer portion and a flow modifier portion. The retainer portion engages an outer surface of the CNG injector proximate to its outlet by employing e.g., a press-fit, snap-fit, welded, or screw-on connection. The flow modifier portion affects the flow distribution pattern of gaseous fuel through the attached nozzle. The flow modifier portion includes the flow passage and flow channel(s) of the attached nozzle. The flow channel(s) may extend along numerous axes to disperse the gaseous fuel in a particular pattern within the intake manifold.

In another aspect of the present invention, the flow channel may be disposed about an oblique axis to the longitudinal axis, and gaseous flow discharged through a singular oblique flow channel.

In yet another aspect of the present invention, a method of flowing gaseous fuel through the seat orifice, along the flow passage, and through the flow channel(s) of the attached nozzle is described. The resulting discharge pattern of the gaseous fuel improves the mixing characteristics of the gaseous fuel within the intake manifold. The method can be achieved by: flowing gaseous fuel through the seat orifice along the longitudinal axis; and dispersing the gaseous fuel into separate columns disposed either obliquely to the longitudinal axis or generally perpendicular to the longitudinal axis.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 2 illustrates a close-up perspective view of the CNG injector and attached nozzle with spray distribution pattern from four flow channels.

FIG. 3 illustrates a close-up cross-sectional view of the preferred embodiment of an attached nozzle that, in particular, shows the various relationships between various surfaces in the attached nozzle.

DETAILED DESCRIPTION OF THE PREFERRED EMBODIMENTS

Figure 1:
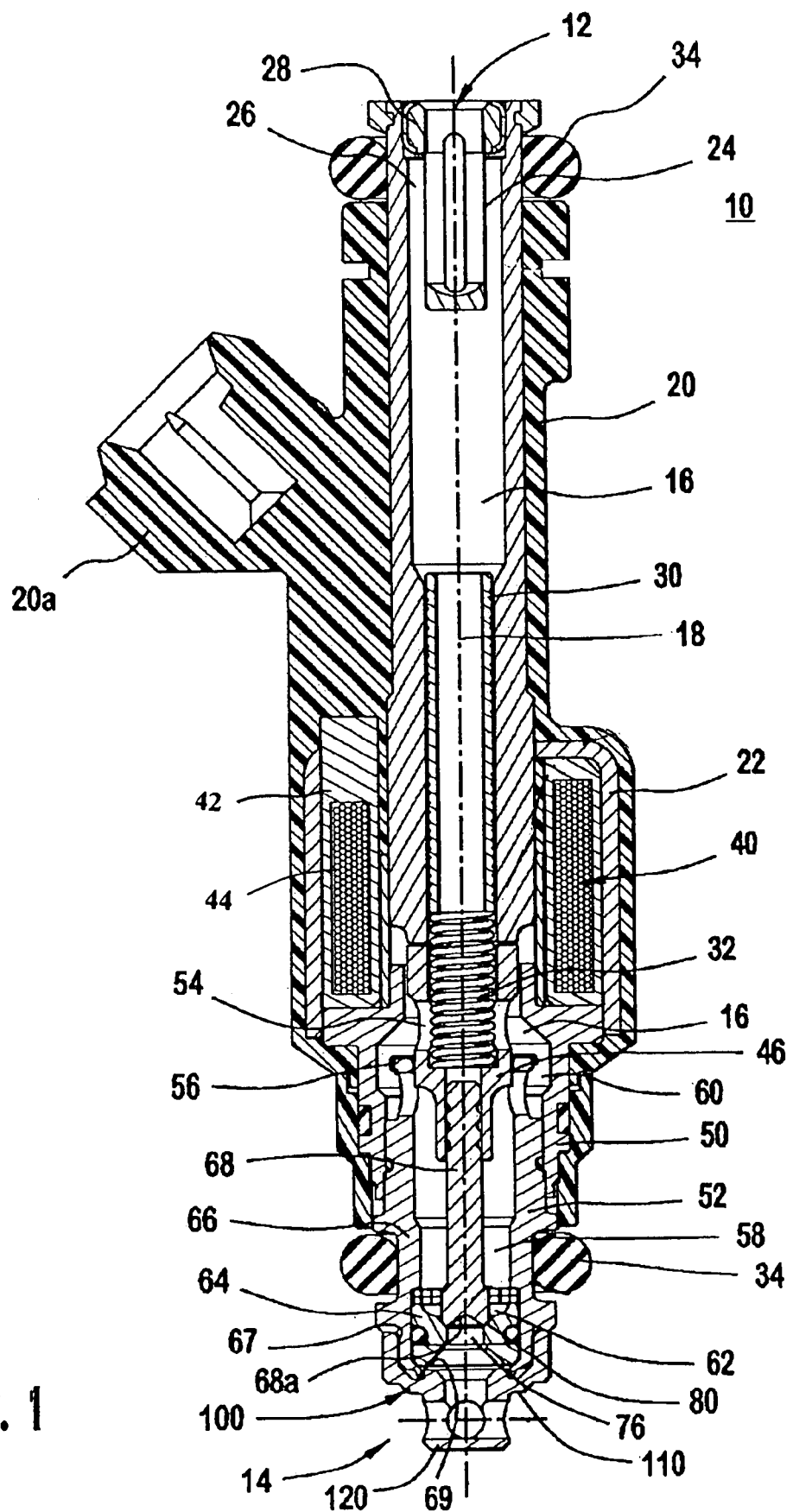
FIG. 1 illustrates a cross-sectional view of the preferred embodiment of the CNG injector and attached nozzle.

FIG. 1 illustrates a fuel injector, in particular a high-pressure CNG injector 10. The CNG injector 10 has a housing, which includes a fuel inlet 12, a fuel outlet 14, and a fuel passageway 16 extending from the inlet 12 to the outlet 14 along a longitudinal axis 18. The housing includes an overmolded plastic member 20 cincturing a coil housing 22.

A fuel filter 24 with an inlet passage 26 is disposed within the overmolded plastic member 20. The inlet passage 26 serves as part of the fuel passageway 16 of the CNG injector 10. A fuel filter retainer member 28 and an adjustable tube 30 is provided in the inlet passage 26. The preload adjustment tube 30 is positionable along the longitudinal axis 18 before being secured in place, thereby varying the length of an armature bias spring 32. In combination with other factors, the length of the spring 32, and hence the bias force against the armature, control the quantity of gaseous fuel flow through the CNG injector 10. The overmolded plastic member 20 also supports an electrical connector 20a that receives a plug (not shown) to operatively connect the CNG injector 10 to an external source of electrical potential, such as an electronic control unit ECU (not shown). An elastomeric O-ring 34 is provided in a groove on an exterior extension of the filter 24 or outlet 14. The O-ring 34 sealingly secures the filter 24 to a gaseous fuel supply member (not shown), such as a fuel rail and the outlet 14 to an intake manifold.

The coil housing 22 encloses a coil assembly 40 as shown in FIG. 1. The coil assembly 40 includes a bobbin 42 that retains a coil 44. The ends of the coil assembly 40 are electrically connected to the connector 20a of the overmolded plastic member 20. An armature 46 is supported for relative movement along the axis 18 with respect to the filter 24. The armature 46 is supported by a body shell 50, and a body 52. The armature 46 has an armature passage 54 in fluid communication with the inlet passage 26.

The body shell 50 engages the body 52. An armature guide eyelet 56 is located on an inlet portion 60 of the body 52. An axially extending body passage 58 connects the inlet portion 60 of the body 52 with an outlet portion 62 of the body 52. The armature passage 54 of the armature 46 is in fluid communication with the body passage 58 of the body 52. A seat 64, which is preferably a metallic material, is mounted at the outlet portion 62 of the body 52.

As shown in FIG. 1, the body 52 includes a neck portion 66 that extends between the inlet portion 60 and the outlet portion 62. The neck portion 66 can be an annulus that surrounds a closure member 68. The closure member 68 is operatively connected to the armature 46, and can be a substantially cylindrical needle. The cylindrical closure member 68 is centrally located within and spaced from the neck portion so as to define a part of the body passage 58. The cylindrical closure member 68 is axially aligned with the longitudinal axis 18 of the CNG injector 10 also includes an inward conical taper 68a on the bottom surface of the closure member 68. Significant features of the closure member herein are also disclosed in U.S. Pat. No. 6,328,231 entitled "Compressed Closure member Gas Injector Having Low Noise Valve Closure member," the disclosure of which is incorporated herein by reference. Features of the CNG injector 10 are also disclosed in commonly assigned, commonly filed (application Ser. No. 09/320,178) application entitled "Contaminant Tolerant Compressed Natural Gas Injector and Method of Directing Gaseous Fuel Therethrough," the disclosure of which is incorporated herein by reference.

Operative performance of the CNG injector 10 is achieved by magnetically coupling the armature 46 to the end of the filter 24 that is closest to the inlet portion 60 of the body 52. Thus, the lower portion of the filter 24 that is proximate to the armature 46 serves as part of the magnetic circuit formed with the armature 46 and coil assembly 40. The armature 46 is guided by the armature guide eyelet 56 and is responsive to an electromagnetic force generated by the coil assembly 40 for axially reciprocating the armature 46 along the longitudinal axis 18 of the CNG injector 10. The electromagnetic force is generated by current flow from the ECU (not shown) through the coil assembly 40. Movement of the armature 46 also moves the operatively attached closure member 68. The closure member 68 opens and closes the seat orifice 76 of the seat 64 to permit or inhibit, respectively, gaseous fuel from exiting the outlet of the CNG injector 10. In order to open the seat orifice 76, the seal between the tip of closure member 68 and the seat 64 is broken by upward movement of the closure member 68. The closure member 68 moves upwards when the magnetic force is substantially higher than necessary to lift the armature closure member assembly against the force of spring 32. In order to close the seat orifice 76 of the seat 64, the magnetic coil assembly 40 is de-energized. This allows the tip of closure member 68 to re-engage surface 80 of seat 64 and close passage 76. During operation, gaseous fuel flows in fluid communication from the fuel inlet source (not shown) through the fuel inlet passage 26 of the filter 24, the armature passage 54 of the armature 46, the body passage 58 of the body 52, and the seat orifice 76 of the seat 64 and is injected from the CNG injector 10.

As shown in FIGS. 1 and 3, an attached nozzle 100 is located proximate to the seat of the CNG injector 10 and, includes a retainer portion 110 and a flow modifier portion 120 as shown in FIG. 3. The attached nozzle may be made from a suitable material for gaseous fuel. Preferably, the attached nozzle may be made from a metallic material, most preferably stainless steel.

The retainer portion 110 of the attached nozzle engages an outer surface 67 of the outlet 14 (shown in FIG. 1) about the longitudinal axis 18 of the CNG injector 10. A first retainer surface 112 of the retainer portion 110 couples with the outer surface 67 through e.g., a press-fit, snap-fit, welded, or screw-on connection. The first retainer surface 112 forms a cylindrical surface to surround the outer surface 67. Substantially perpendicular to the first retainer surface is a rim surface 111 that can engage a bottom surface of the seat 64 as shown in FIGS. 1 and 3. Preferably, the first retainer surface 112 has an inner diameter of about 8 millimeters and a length along the longitudinal axis 18 of about 2 millimeters. Preferably, the rim surface 111 has an outer diameter of about 9 millimeters.

A second retainer surface 113 and a third retainer surface 114 of the retainer portion 110 connect the first retainer surface 112 to the flow modifier portion 120 of the nozzle 100 as shown in FIG. 3. The second retainer surface 113 may be at an oblique angle to the longitudinal axis 18 while the third retainer surface 114 is planar and orthogonal to the longitudinal axis 18, therein creating an annular pocket 115 about the longitudinal axis 18 as shown in FIGS. 1 and 3. The annular pocket 115 may enclose a flange portion 69 of the outlet 14 to secure the attached nozzle 100 to the outlet 14.

The flow modifier portion 120 affects the flow distribution pattern of gaseous fuel (GF) through the attached nozzle 100, as shown in FIG. 2, by the dashed outline of a gaseous fuel cloud (FC). The flow modifier portion 120 defines a flow passage 121 that is in fluid communication with the seat orifice 76 and extends along a first flow modifier surface 122 disposed about the longitudinal axis 18. The first flow modifier surface 122 may have a tapered surface 123 about the longitudinal axis 18 creating a truncated conical surface contiguous to the flow passage 121. The flow passage 121 extends to a first flow channel 124 located within the attached nozzle 100 as shown in FIG. 3.

Figure 4:
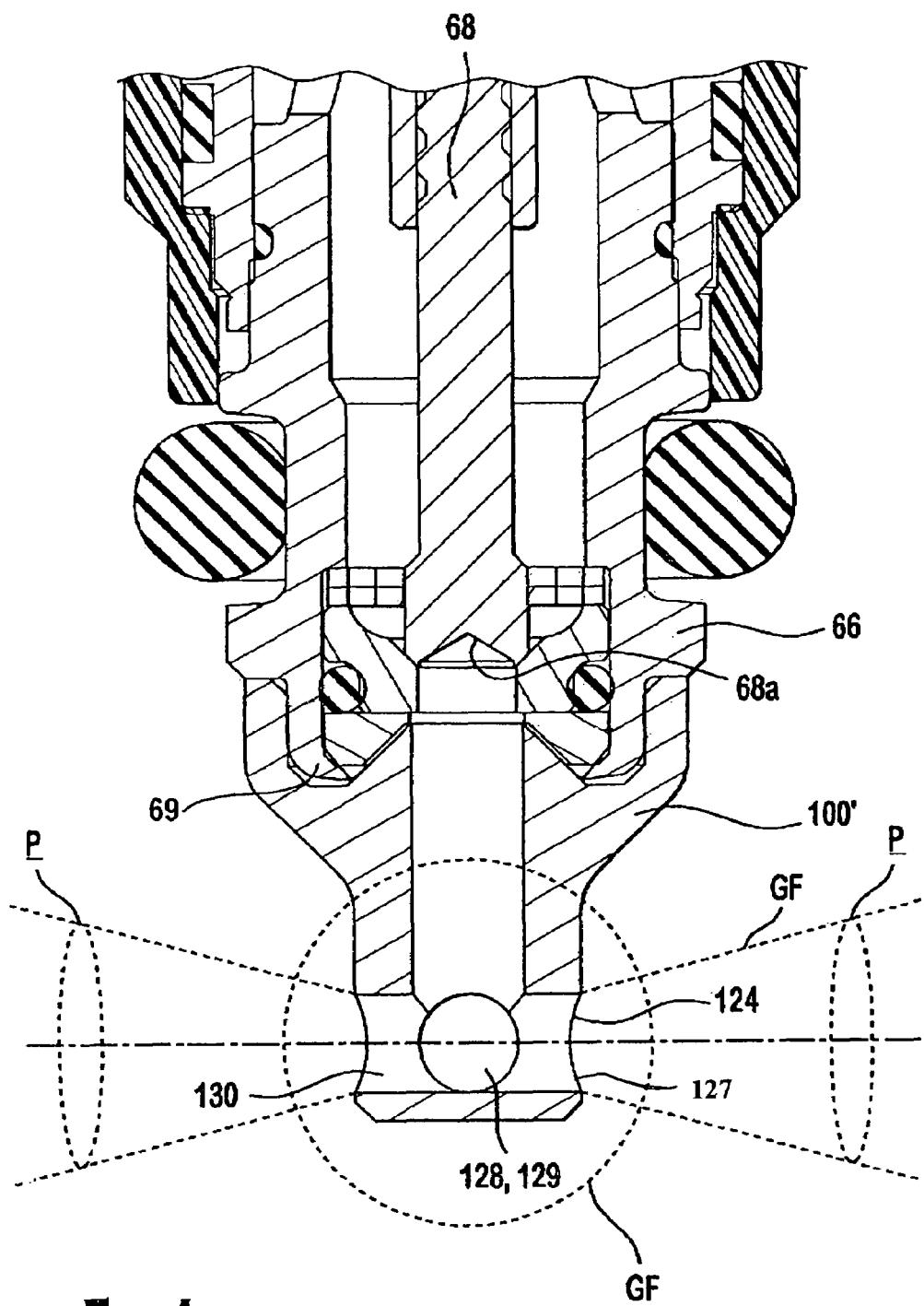
FIG. 4 illustrates a cross-sectional view of the CNG injector and another attached nozzle with the four flow channels.

The first flow channel 124 is encompassed by a second flow modifier surface 125 and extends along a first axis 126a that is generally orthogonal to the longitudinal axis 18. The first flow channel 124 directs gaseous fuel to a first discharge outlet 127 of the attached nozzle 100 as shown in FIG. 4. Preferably the first flow channel 124 is generally circular in cross-section and has an inside diameter of about 2 millimeters.

In one preferred embodiment, a second flow channel (130 in FIG. 4) may extend along the first axis 126a, but in a direction diametrically opposed to the first channel 124. In another preferred embodiment of the present invention, a third flow channel 128 and a fourth flow channel 129 may be extended along a second axis 126b that is generally orthogonal to both the first axis 126a and the longitudinal axis 18 of the attached nozzle 100 as shown in FIG. 3. The third and fourth flow channels are diametrically opposed to each other and may be generally circular in cross-section as shown in FIGS. 3 and 4.

Gaseous fuel flows through the seat orifice 76, along the flow passage 121, and may be dispersed through one, two, three, four, or other multiple flow channel configurations of the attached nozzle 100. Thus, as shown in FIG. 4, the resulting multiple columns (P) of gaseous fuel are dispersed generally perpendicular to the longitudinal axis 18 of the CNG injector 10 to improve the mixing characteristics within the intake manifold (not shown). The above-mentioned singular oblique flow channel 141 delivers a single column (P) of gaseous fuel (GF) to the intake manifold at the first angle θ with respect to the longitudinal axis 18 to that in conjunction with an intake manifold geometry, the fuel injector is able to improve its mixing characteristics with air flow in the manifold. The preferred pressure at which the CNG injector 10 operates is approximately 200 pounds per square inch gauge pressure and a pressure drop of no more than 5 pounds per square inch gauge is expected across the nozzle.

Figure 6:
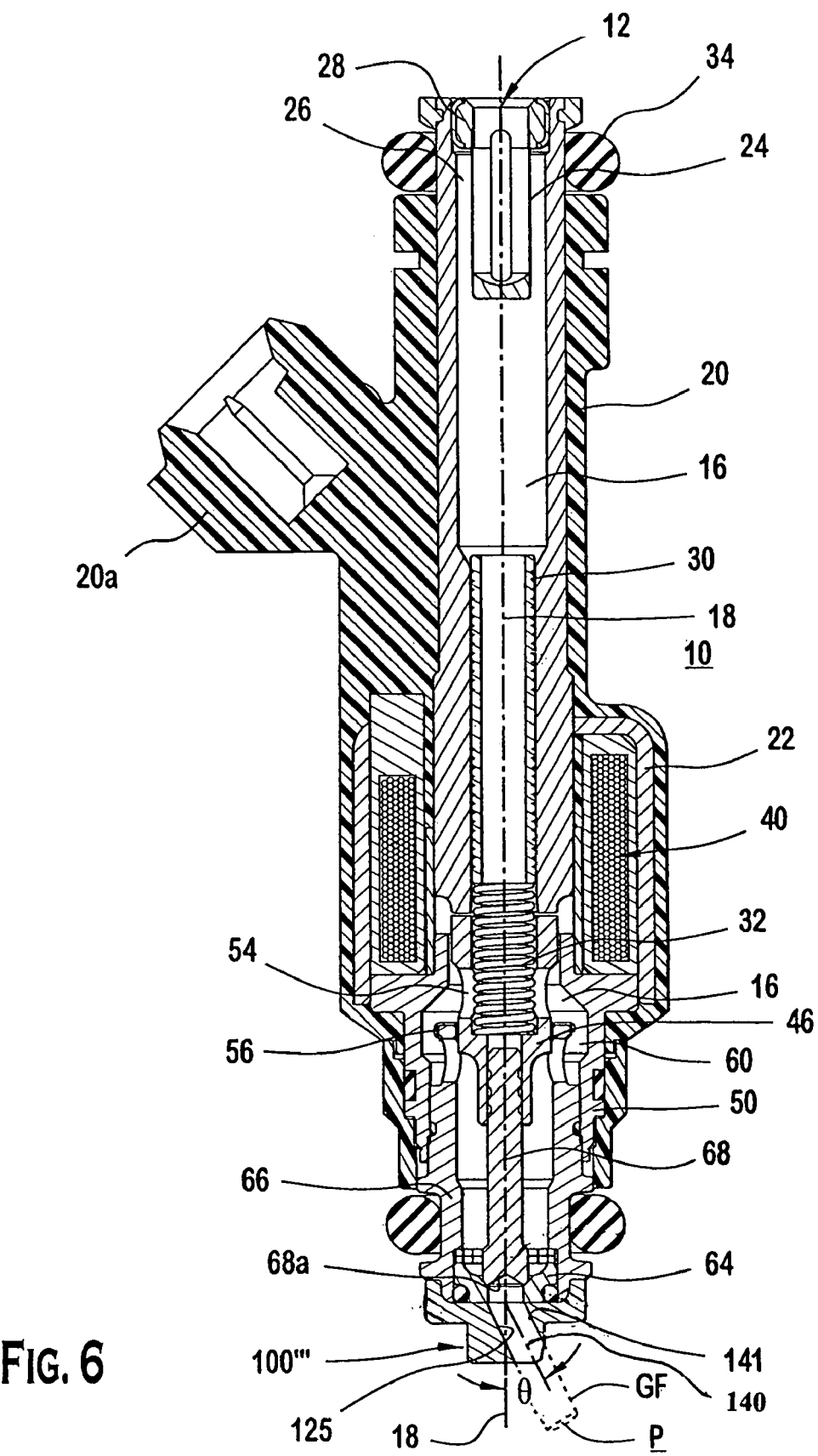
FIG. 6 illustrates a cross-sectional view of another preferred embodiment of the CNG injector and attached nozzle wherein a flow channel is oblique to the longitudinal axis.

As shown in FIG. 6, the second flow modifier surface 125 of nozzle 100 may be disposed about an oblique axis 140 to the longitudinal axis 18 and gaseous flow discharged through a singular oblique flow channel 141. The oblique flow channel angled at a first angle θ oblique to the longitudinal axis 18 may vary in range from 10° to 30°. However, the preferred first angle θ is approximately 26°.

Figure 5:
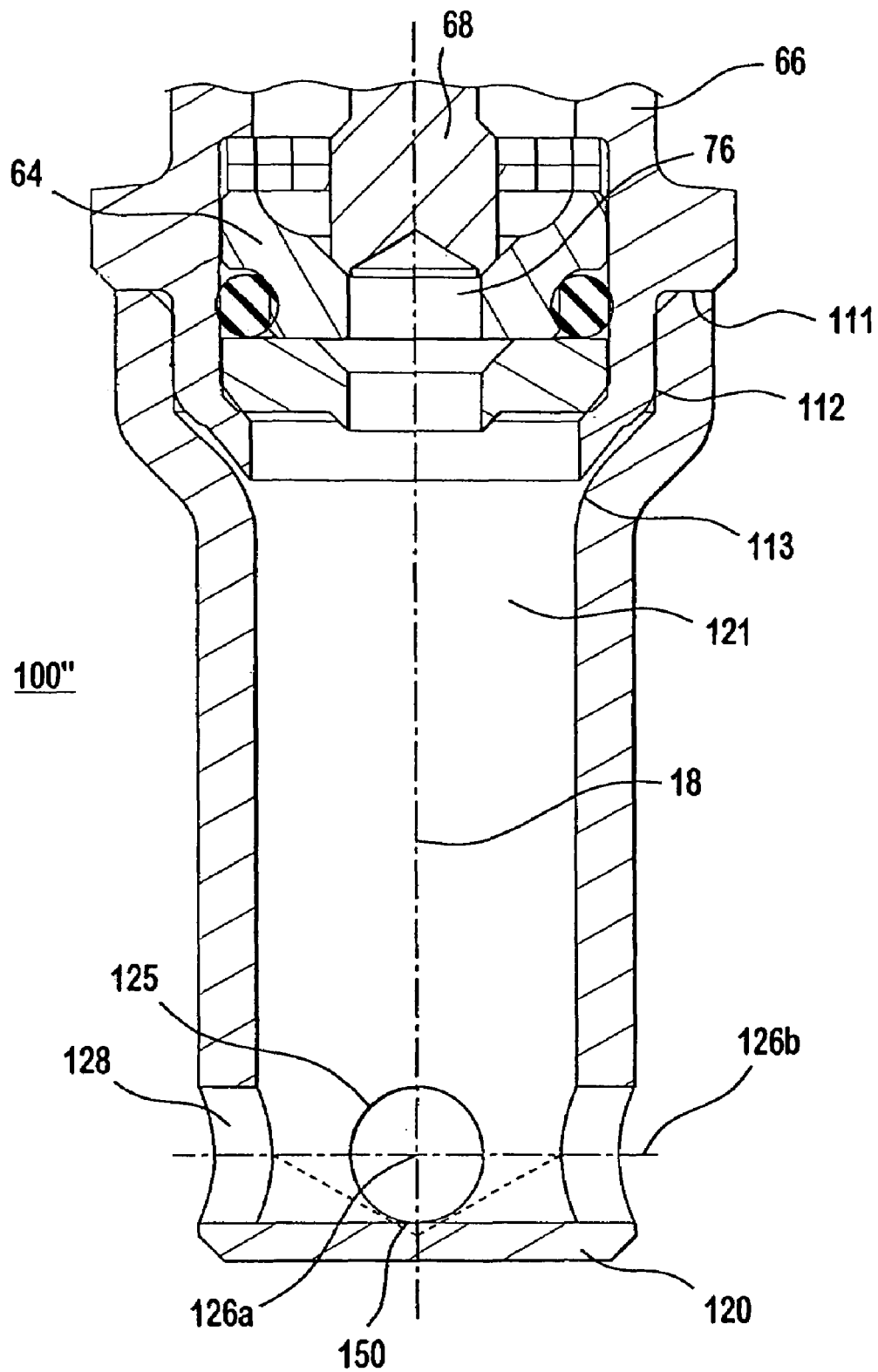
FIG. 5 illustrates a cross-sectional view of another preferred embodiment of an attached nozzle wherein a retainer portion of the attached nozzle does not include a third retainer surface.

In yet another preferred embodiment of a nozzle as shown here in FIG. 5 as nozzle 100, the retainer portion 110 may omit the third retainer surface 114. Thus, the oblique second retainer surface 113 may taper contiguous to the flow passage 121 of the flow modifier portion 120. The flow passage 121 may be cylindrical in shape and substantially wider than the flow channels located orthogonally below it. The bottom of the flow passage 121 may terminate in a conical portion 150 located slightly below the bottom surface of the flow channels as shown in FIG. 5.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A fuel injector comprising:
    an inlet and an outlet and a passage extending along a longitudinal axis from the inlet to the outlet, the inlet communicable with a flow of gaseous fuel;
    a closure member disposed in at least two positions along the longitudinal axis in the passage;
    a seat disposed in the passage proximate the outlet, the seat including a sealing surface contiguous to a portion of the closure member in one of the two position of the closure member and a seat orifice extending through the seat from the sealing surface along the longitudinal axis;
    a flow modifier having a retainer portion and flow modifier portion, the retainer portion being coupled to an outer surface of the outlet, the flow modifier including:
        a first flow modifier surface and a second flow modifier surface, the first flow modifier surface disposed about the longitudinal axis to define a flow passage in fluid communication with the seat orifice and the second flow modifier surface disposed along and about a first axis generally orthogonal to the longitudinal axis to define at least a flow channel,
    wherein the second flow modifier surface further comprises a second flow channel diametric to the first flow channel along the first axis, and third and fourth flow channels aligned along a second axis orthogonal to the first and longitudinal axes,
    wherein each of the flow channels comprises a flow channel having a generally circular cross-section about respective first and second axes,
    wherein the retainer portion comprises:
        a first retainer surface contiguous to an outer surface of the outlet along the longitudinal axis to define a cylindrical inner retainer surface;
        a second retainer surface that surrounds the outer surface of the outlet at an oblique angle along the longitudinal axis to define a truncated conic inner retainer surface; and
        a third retainer surface defining a generally planar surface contiguous to the second retainer surface and the flow modifier portion to define an annular pocket about the longitudinal axis.

2. The fuel injector of claim 1, wherein the first flow modifier surface comprises a tapered surface about the longitudinal axis to define a truncated conic surface contiguous to a cylindrical surface disposed about the longitudinal axis that form the flow passage.

3. The fuel injector of claim 2, wherein the second flow modifier surface comprises a surface cincturing the first axis to define a cylindrical flow channel surface.

4. The fuel injector of claim 3, wherein the outlet comprises a flange portion disposed in the annular pocket.

5. The fuel injector of claim 4, wherein the outlet comprises a boss portion disposed about the longitudinal axis, the boss portion having a top surface to retain a sealing member and a bottom surface contiguous to a rim of the retainer portion.

6. The fuel injector of claim 5, wherein the rim has an outer diameter of about 9 millimeters.

7. The fuel injector of claim 6, wherein the cylindrical inner retainer surface comprises a cylinder with an inside diameter of about 8 millimeters and a length along the longitudinal axis of about 2 millimeters.

8. The fuel injector of claim 6, wherein the flow modifier has an overall length of about 7 millimeters.

9. The fuel injector of claim 6, wherein the cylindrical flow channel surface comprises a cylinder with an inside diameter of about 2 millimeters.

\* \* \* \* \*